US006959416B2

(12) United States Patent
Manning et al.

(10) Patent No.: US 6,959,416 B2
(45) Date of Patent: Oct. 25, 2005

(54) METHOD, SYSTEM, PROGRAM, AND DATA STRUCTURES FOR MANAGING STRUCTURED DOCUMENTS IN A DATABASE

(75) Inventors: Kyle P. Manning, Lafayette, CO (US); Dwight Ross Palmer, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 09/772,697

(22) Filed: Jan. 30, 2001

(65) Prior Publication Data

US 2002/0103829 A1    Aug. 1, 2002

(51) Int. Cl.[7] .............................................. G06F 19/00
(52) U.S. Cl. ......................... 715/513; 707/102; 707/3
(58) Field of Search ....................... 715/513; 707/100, 707/101, 3, 102; 705/14

(56) References Cited

U.S. PATENT DOCUMENTS

| | | | |
|---|---|---|---|
| 6,012,098 A | | 1/2000 | Bayeh et al. |
| 6,502,101 B1 * | 12/2002 | Verprauskus et al. ....... 707/101 |
| 6,581,062 B1 * | 6/2003 | Draper et al. ................ 707/100 |
| 6,650,433 B1 * | 11/2003 | Keane et al. ............... 358/1.15 |
| 6,704,736 B1 * | 3/2004 | Rys et al. .................... 707/100 |
| 6,721,727 B2 * | 4/2004 | Chau et al. ..................... 707/3 |
| 2002/0156811 A1 * | 10/2002 | Krupa ......................... 707/513 |
| 2003/0163370 A1 * | 8/2003 | Chen et al. .................... 705/14 |

FOREIGN PATENT DOCUMENTS

EP    1004987 A1    11/1998

OTHER PUBLICATIONS

Shanmugasundaram, J. et al. "Relational Databases for Querying XML Documents: Limitations and Opportunities", Very Large Data Bases, Proceedings of International Conference, 25th, Edinburgh, Scotland, Sep. 7-10, 1999, pp. 302-314.
Microsoft, Corp. "Fundamentals of Relational Database Design" [online], Jan. 12, 2000, pp. 1-17, [Retrieved from the Internet on Dec. 3, 2000]. Retrieved online from URL subdivision at <http://www.microsoft.com>.

* cited by examiner

*Primary Examiner*—Doug Hutton
(74) *Attorney, Agent, or Firm*—David W. Victor; Konrad Raynes & Victor LLP (57) ABSTRACT

Provided is a method, system, program and data structures for managing structured documents. Each structured document has at least one element in common and each element is capable of having one defined data object. At least one table is generated based on a schema of elements in the managed structured documents. Further, at least one table is designed to include entries for each element instance in the managed structured documents and at least one object for one element instance. For each element instance in the managed structured documents, one entry is added to at least one table including information on an element identifier for the element instance, the data object for the element instance, and a document identifier for the structured document including the element instance. The at least one table provides an association of the element instance, the at least one data object for the element instance, and the document identifier of the structured document including the element instance.

47 Claims, 7 Drawing Sheets

METHOD, SYSTEM, PROGRAM, AND DATA STRUCTURES FOR MANAGING STRUCTURED DOCUMENTS IN A DATABASE

BACKGROUND OF THE INVENTION

1. Field of the Invention

The present invention relates to a method, system, program, and data structures for managing structured documents in a database.

2. Description of the Related Art

Many documents and data objects are encoded in the Extensible Mark-up Language (XML) as structured documents. Just about any data type can be encoded within an XML structured document, such as vector graphics, e-commerce transactions, mathematical equations, object metadata, server APIs, etc. XML documents include tags to mark a start and end of each of the logical parts (called elements) of the document. For instance, if the XML document defines a book, the elements would include the table of contents, chapters, appendices, etc. Each element may include one or more associated objects. The associated object may comprise an attribute value or content, such as the case with a text object element including text, a graphics object element including an image, etc. An XML document further includes a definition of each element in a formal model, known as a Document Type Definition (DTD). The DTD provides attributes for each element and indicates the relationship of the elements and possible attribute values for the elements. Elements may be arranged in a hierarchical relationship. In such case, the DTD would define the hierarchical relationship of the elements to one another. Further details of XML are described in the publication "Extensible Markup Language (XML) 1.0", Second Edition (Copyright W3C, Oct. 6, 2000), which publication is incorporated herein by reference in its entirety.

Users can encode and view an XML document with the Document Object Model (DOM) application program interface (API). The DOM interface is described in the publication entitled "Document Object Model (DOM) Level 1 Specification, Version 1.0," document no. REC-DOM-Level-1-19981001 (Copyright W3C 1998), which publication is incorporated herein by reference in its entirety. The DOM interface represents the document as a hierarchical arrangement of nodes. The DOM interface specifies various commands to access elements and attributes within the DOM hierarchy.

Because nowadays many documents, especially documents available over the Internet, are encoded as XML documents, there is a need in the art to manage and index the contents of XML documents. In the prior art, if a user wants to search the content of XML documents, one technique is to use the DOM interface commands or an XML parser to access the element(s) in each document subject and then determine whether the objects associated with an element, e.g., attribute values or content, match a search or query criteria. The term "object" discussed in association with elements as used herein refers to any data associated with an element, such as attribute values, content (e.g., text content, images, movies, audio, etc.) Such an approach requires traversing each XML document to locate the object, eg., attribute value or content, subject to the search, retrieve the object, and then compare the accessed object with the search criteria. Moreover, in complex documents including numerous elements at many different hierarchical levels, encoding the methods to traverse the DOM tree to a particular node may be substantially complex.

The increased interest in providing query and search facilities for XML documents has led to the creation of an XML Query Group at the World Wide Web Consortium (W3C). The goal of the XML Query Group is to provide flexible query facilities to extract data from real and virtual documents on the Web to allow interaction between the XML Web world and the database world with the goal of allowing collections of XML files to be accessed like databases.

For these reasons, there is a need in the art for methodologies that allow for database like management and searching of XML and other interchangeable structured document formats.

SUMMARY OF THE PREFERRED EMBODIMENTS

Provided is a method, system, program and data structures for managing structured documents. Each structured document has at least one element in common and each element is capable of having one defined data object. At least one table is generated based on a schema of elements in the managed structured documents. Further, at least one table is designed to include entries for each element instance in the managed structured documents and at least one object for one element instance. For each element instance in the managed structured documents, one entry is added to at least one table including information on an element identifier for the element instance, the data object for the element instance, and a document identifier for the structured document including the element instance. The at least one table provides an association of the element instance, the at least one data object for the element instance, and the document identifier of the structured document including the element instance.

The data object associated with the elements may comprise one of al attribute value or content.

In further implementations, a query is received to identify instances of structured documents having element instances that have at least one data object satisfying a search criteria provided with the query. A query is performed with respect to the at least one table to determine the element identifiers of element instances having data objects that satisfy the search criteria.

In further implementations, the structured document comprises an Extensible Markup Language (XML) document and the element schema is determined from a document type definition (DTD) in the XML managed structured documents.

The described implementations provide a technique for using a database system to provide indexable and searchable information on documents in a structured document format to allow searching on objects in the structured documents using the database system facilities.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
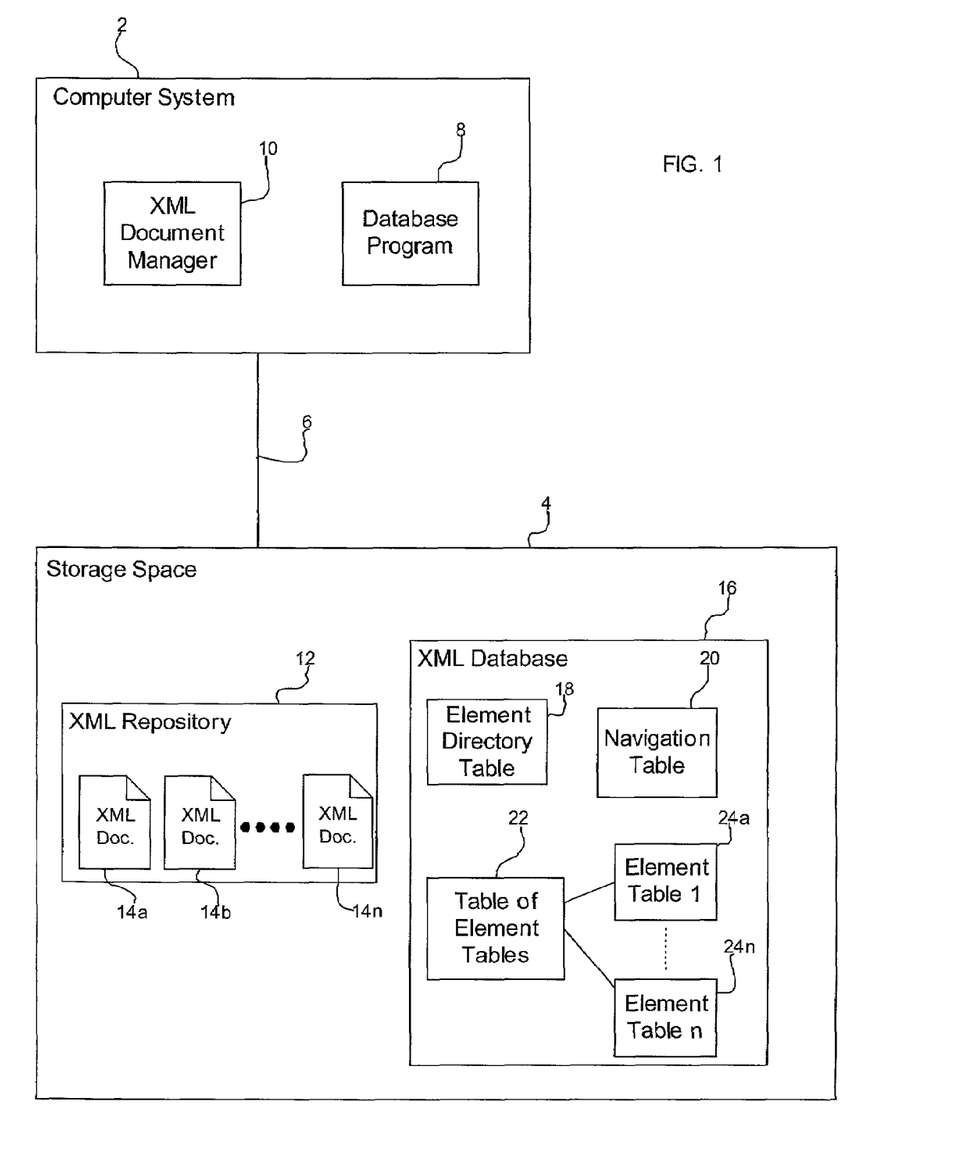
FIG. 1 is an illustration of a computing environment in accordance with certain implementations of the present invention.

FIG. 1 illustrates a computing environment for certin implementations of the invention. A computer system 2 is in communication with a storage space 4 over a communication interface 6. The computer system 2 may comprise any computing device known in the art such as a personal computer, mainframe, workstation, Internet web server, hand held computer, etc., including an operating system. The storage space 4 comprises any storage device or group of storage devices known in the art, e.g., hard disk drives, optical disks, tapes, battery backed up RAM, etc., where the storage space 4 may be implemented in a single storage device, an array of storage devices or storage devices distributed over a network. The communication interface 6 may comprise a network connection if the computer system 2 and storage space 4 are within separate boxes. Alternatively, if the storage space 4 is local to the computer system 2, then the communication interface 6 would comprise the computer system 2 components, e.g., the bus, etc., for interfacing with external devices such as storage devices.

The computer system 2 includes a database program 8 known in the art, such as a relational database program, in which related data is stored in one or more table data structures. An XML document manager 10 maintains searchable database tables including information on the XML documents. The storage space 4 includes an XML repository 12 including multiple XNL documents 14a, b, . . . n that have similar document structures, such as documents sharing the same document type definition (DTD) or the same elements having the same attributes and objects. An XML database 16 includes database tables 18, 20, 22, 24a, . . . , n created by the database program 8 to maintain searchable and indexable information on the elements and associated objects, e.g., attribute values or content, of the XML documents 14a, b, . . . n.

Figure 2:
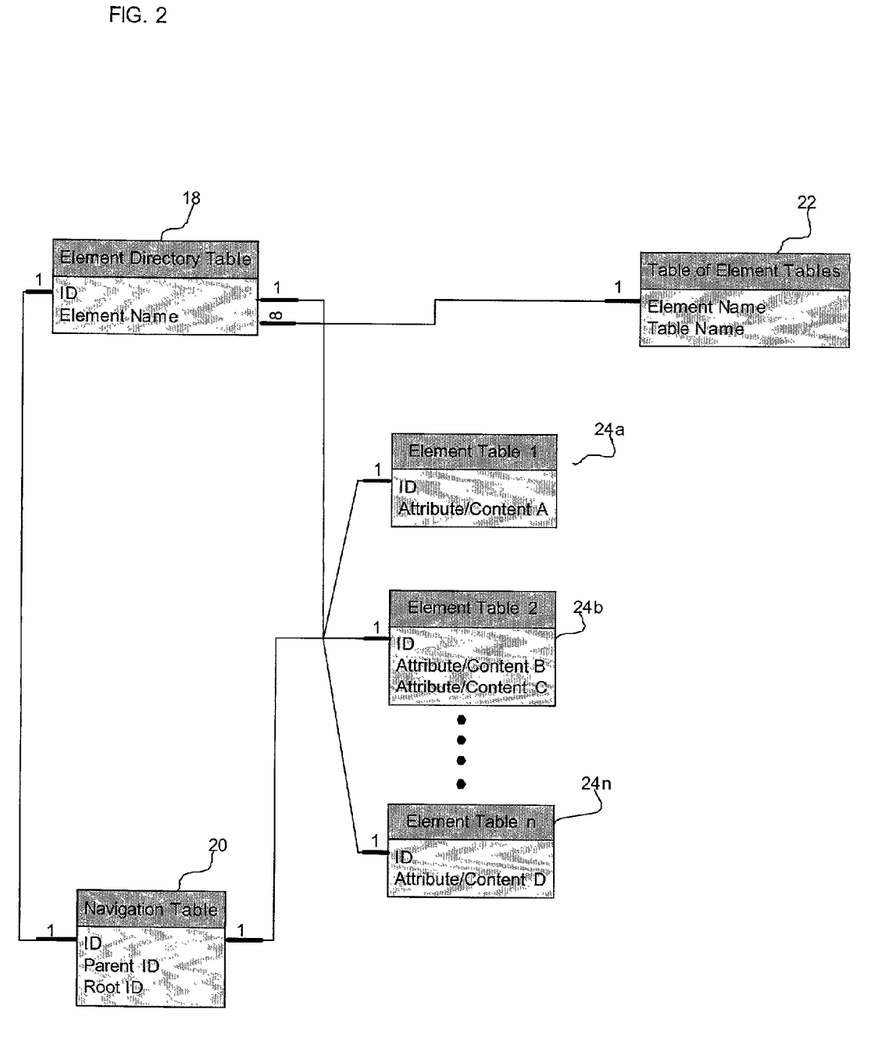
FIG. 2 illustrates a design of database tables in accordance with certain implementations of the present invention.

FIG. 2 illustrates the relationship of the database tables 18, 20, 22, 24a . . . n that maintain information on the XML documents 14a, b, . . . n. An element directory table 18 includes a column for a unique identifier of each instance of an element in the XML documents 14a, b, . . . n and a second column for the name of the element In certain implementations, the element identifiers are assigned sequentially according to the order in which the element is parsed when scanning the XML document 14a, b, . . . n to build the database tables 18, 20, 22, 24a, . . . n. In this way, the order in which the elements appear in the XML document 14a, b, . . . n can be ascertained from the relative ordering of the unique identifiers in the database tables 18, 20, 22, 24a, . . . n Thus, if there are multiple instances of an element in a single document, then an entry would be included in the element directory table 18 for each instance of such element. Similarly, if there are multiple documents including the elements, then the element directory table 18 provides a unique identifier of each element instance in all the XML documents 14a, b, . . . n for which information is maintained by the XML database 16. Each XML document 14a, b, . . . n has a root element. The document element maintained in the element directory table 18 provides the name of the root element for that document, thus providing a unique identifier for the XML document 14a, b, . . . n.

FIG. 2 further illustrates the relationship of the tables 18, 20, 22, 24a . . . n maintained in the XML database 16. The element directory table 18 has a one-to-one relationship with the navigation table 20, in that there is one entry in the navigation table 18 for each entry in the element directory table 18 because for each instance of an element recorded in the element directory table 18, there is a corresponding entry in the navigation table 20 providing parent and root information for the entry. There is a one-to-many relationship between the table of element tables 22 and the element directory table 18 because the table of element tables 22 includes only one entry for each element (which references an element table 24a, b . . . n including an entry for the object associated the element, such as any associated attribute values or content) in the element directory table 18 which can include multiple entries for each element. The element directory table 18 provides an entry for each instance of an element in one of the XML documents 14a, b, . . . n. Similarly, for every entry in the element directory table 18, which includes an entry for each instance of an element in the XML documents 14a, b, . . . n, there is one entry in one of the element tables 24a, b, . . . n providing the associated objects, e.g., attribute values or content, for that instance of the element identified in the element directory table 18.

A navigation table 20 includes an entry for each element instance in the XML documents. A first column provides the unique element identifier of the element instance in one XML document 14a, b, . . . n and a second column indicating the parent element to the element instance identified in the first column. In the described implementations, the hierarchical relationship of elements may be determined from the DTD portion of each XML document 14a, b, . . . n. The third column provides the unique root identifier for the element instance, which comprises the document identifier of the document including the element instance.

A table of element tables 22 includes an entry for each element that may be included in an entry in the element directory table 18. Each entry in the table of element tables 22 identifies an element table 24a . . . n. Each element table 24a . . . n includes a column for the unique element identifier for each instance of the element in the XML documents 14a, b, . . . n managed in the XML database 16. Each element table 24a . . . n also includes one column for each object (e.g., attribute value or content) associated with the element. The entries in the element table 24a . . . n object columns would include the object values, e.g., attribute values or content, for the element identifier. It is also possible that an element may not have any content or attribute values. In such case, the element table 24a, b, c would just include an ID column for that element and no object column.

The XML document manager 10 includes an XML parser known in the art that includes classes and methods for parsing, generating, manipulating, and validating XML documents. The XML document manager 10 is further capable of utilizing a database driver, such as the Open DataBase Connectivity (ODBC) standard, to provide queries and commands to the database program 8 to create, manipulate, and query the tables 18, 20, 22, 24*a, b*, . . . *n* in the XML database 16.

Figure 3:
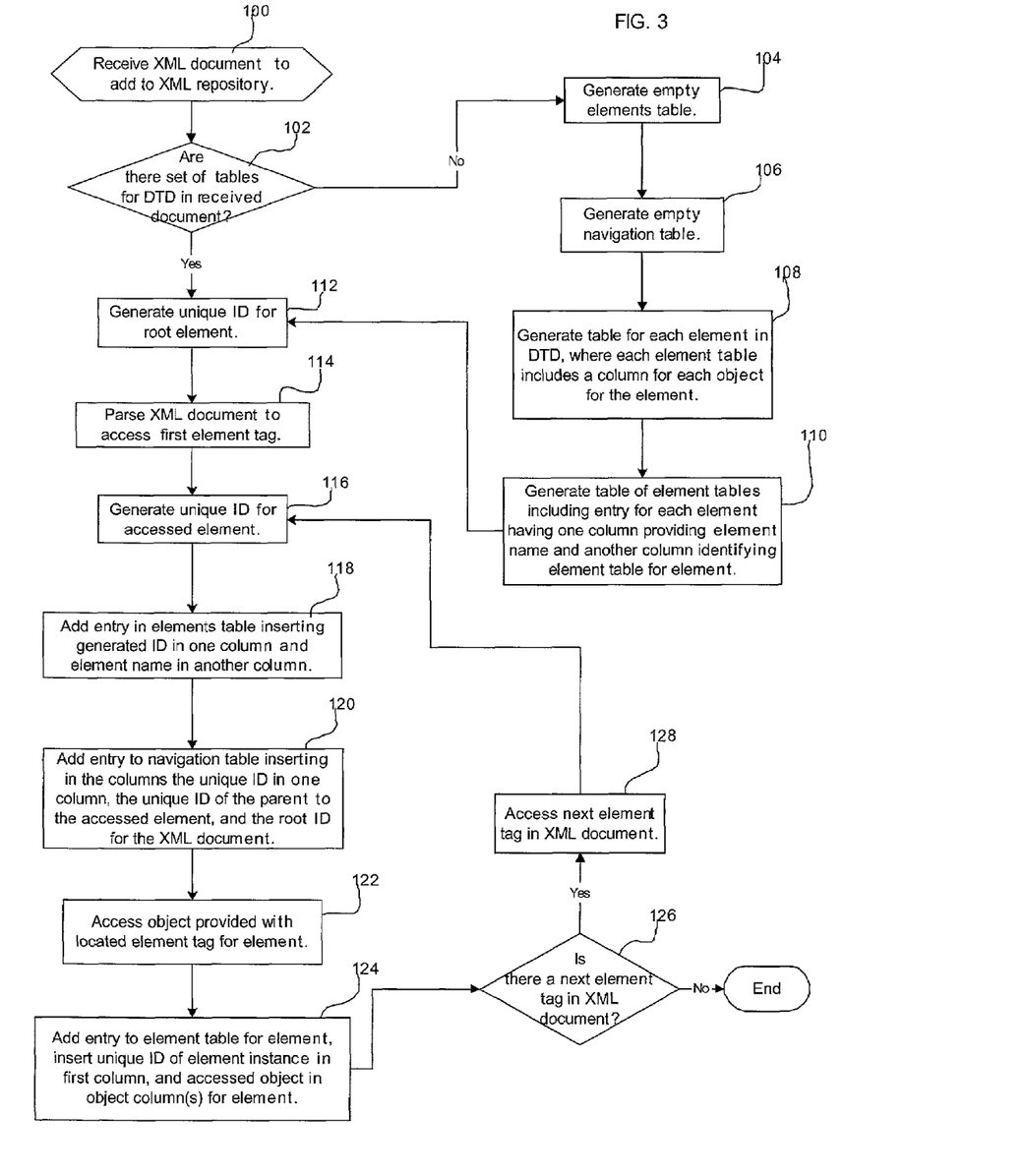
FIG. 3 illustrates program logic to generate database tables providing information on XML documents in accordance with certain implementations of the present invention.

FIG. 3 illustrates logic implemented in the XML document manager program 10 to generate the above described tables 18, 20, 22, 24*a, b*, . . . *n* to provide metadata and allow querying of the XML documents 14*a, b*, . . . *n* in the XML repository 12. Control begins at block 100 with the XML document manager 10 receiving an XML document to add to the repository 12. The XML document manager 10 determines (at block 102) whether there are a set of tables 18, 20, 22, 24*a, b*, . . . , *n* provided for the DTD included in the received document. In certain implementations, a set of searchable database tables 18, 20, 22, 24*a, b*, . . . *n* is provided for each different DTD used by XML documents 14*a, b*, . . . *n* in the repository 12. In further implementations, the XML document manager 10 may maintain a same group of tables 18, 20, 22, 24*a, b*, . . . *n* for documents having different or no DTDs that use the same elements. If there is no set of tables in the XML database 16 for the received XML document, then the XML document manager 10 generates (at block 104) an empty element directory table 18 and an empty navigation table 20 (at block 106). The XML document manager 10 further generates (at block 108) a table 24*a, b*, . . . *n* for each element in the DTD, where each element table 24*a, b*, . . . *n* includes a column for each object, e.g., attribute or content, defined for the element. A table of element tables 22 is generated (at block 110) including an entry for each element having one column providing the element name and another column identifying the element table 24*a, b*, . . . *n* for the element.

Once the XML database tables 18, 20, 22, 24*a, b*, . . . *n* are available (at block 110 or from the no branch of block 102), the XML document manager 10 generates (at block 112) a unique root identifier for the root of the XML document The XML document manager 10 then parses (at block 114) the received XML document to access the element instance at the first element tag in the received XML document A unique element identifier is then generated (at block 116) for this accessed element. The XML document manager 10 then, through a database driver and interface, calls the database program 8 to add (at block 118) an entry to the element directory table 18, and inserts the generated unique element identifier for the accessed element instance in one column and the element name in the other column of the added entry in the element table 18. The XML document manager 10 then adds (at block 120) an entry to the navigation table 20 inserting in the columns of the added entry the unique identifier of the accessed element, the unique identifier of the parent to the accessed element, and the unique identifier of the root for the received XML document The XML document manager 10 accesses (at block 122) the object, e.g., attribute values or content, nested within the located element tag and then adds (at block 124) an entry to the element table 24*a, b*, . . . *n* for the element, and inserts in the added entry the unique identifier of the element instance in one column and each object (e.g., attribute value or content) for the element into the corresponding object column of the element table 24*a, b*, . . . *n*. If (at block 126) there are further element tags in the received XML document, then the XML document manager 10 parses and accesses (at block 128) the next element tag in the XML document and returns to block 116 to add entries for the element directory table 18, navigation table 20 and corresponding element table for the instance of the next accessed element in the XML document.

Figure 4:
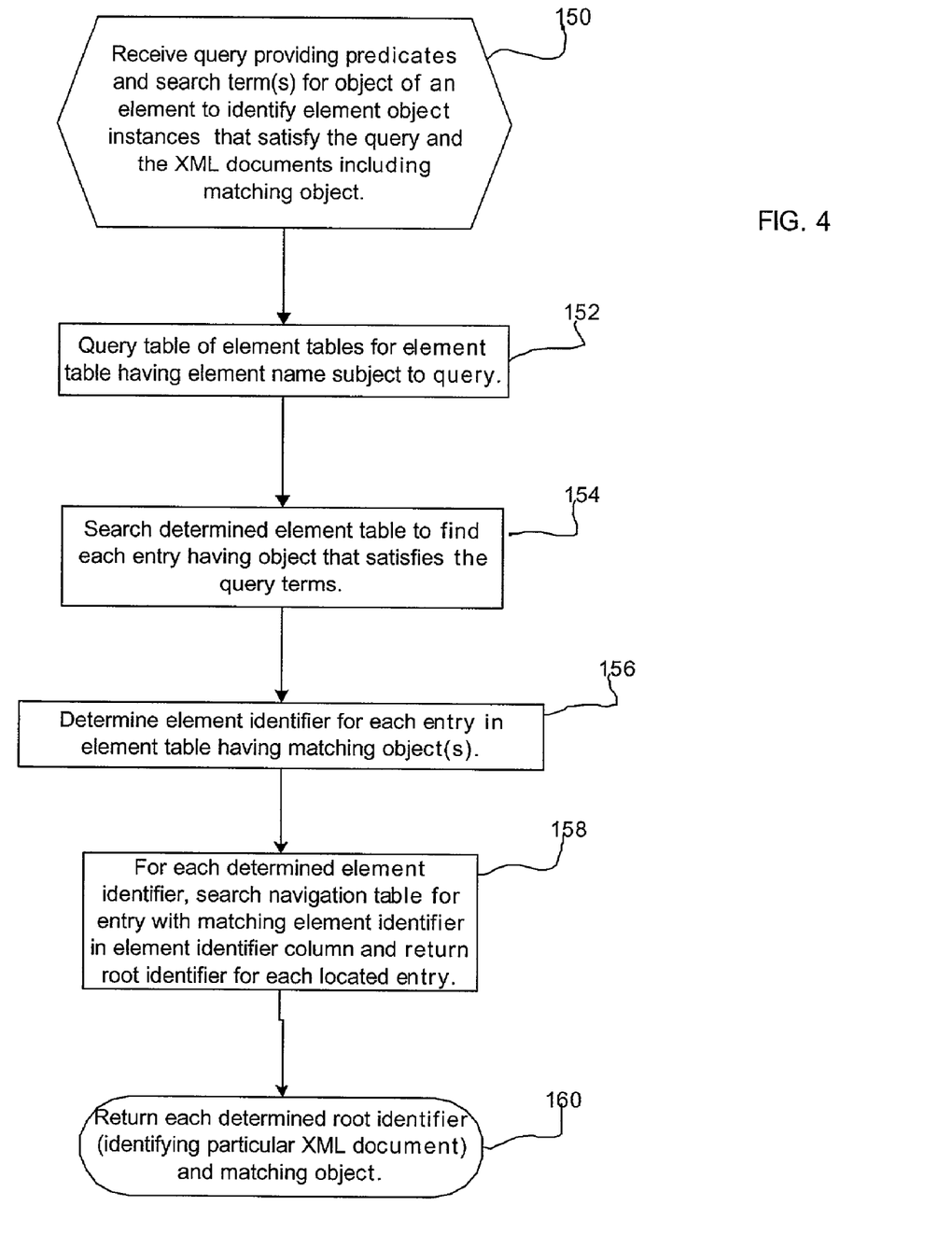
FIG. 4 illustrates program logic to perform a query in accordance with certain implementations of the present invention.

FIG. 4 illustrates logic implemented in the XML document manager 10 to process a query to locate those XML documents having element objects, e.g., attribute values or content, matching search criteria included in the query. Control begins at block 150 with the XML document manager 10 receiving a query including search term(s) and predicates to locate XML documents 14*a, b*, . . . *n* in the XML repository 12 that have element objects including data that matches the search criteria. The XML document manager 10 then calls (at block 152) an interface command to cause the database program 8 to search the table of element tables 22 and return the element table 24*a, b*, . . . *n* at the entry having an element name matching the name of the element that is the subject of the query. The XML document manager 10 will then issue a query (at block 154) to search the determined element table 24*a, b*, . . . *n* to find each entry having object data, e.g., attribute column value(s) or content, that satisfies the query search term(s) and determines (at block 156) the element identifier in each entry in the element table having the matching object. The XML document manager 10 then searches (at block 158) the navigation table 20 to find the entries in the navigation table 20 having an element identifier in the first column that matches one of the determined element identifiers for the elements having an object, e.g., attribute value or content, matching the search criteria. The search identifies the root identifier in those entries in the navigation table 20 having the matching element identifier. The XML document manager 10 then returns (at block 160) the located root identifiers of those determined entries having one of the determined element identifiers that identify an element having object data satisfying the search criteria. The root identifier uniquely identifies the document including the element instance satisfying the search criteria.

Figure 5:
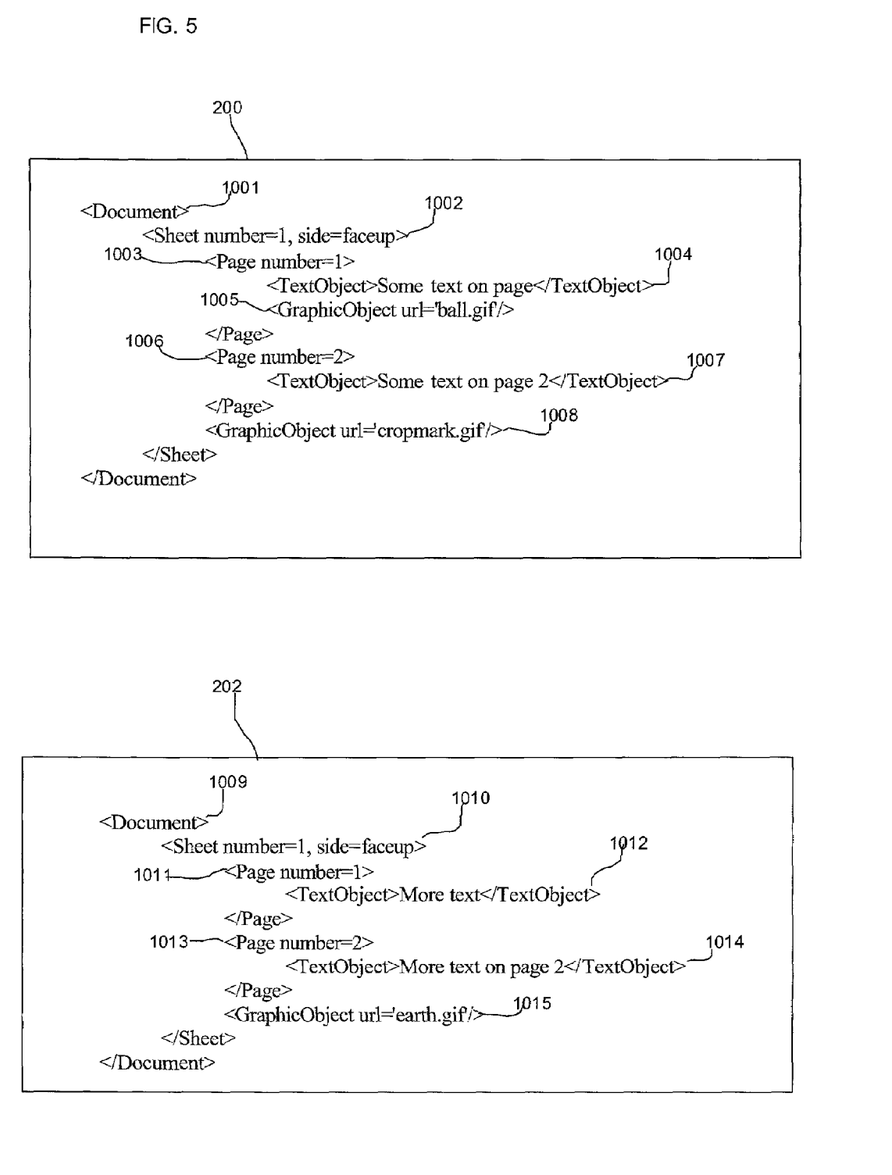
FIG. 5 provides an example of XML documents for which information may be provided in the database system in accordance with certain implementations of the present invention.

FIG. 5 illustrates the content of two XML documents 200 and 202 that implement a job ticket that defines a print job to send to the printer. The elements of each print job include: a Sheet element having as attributes a sheet number and a variable indicating whether the sheet is face up; a Page element having a page number attribute value; a TextObject element having text content, text, e.g., an entire page of text content, a section of a page, etc.; and a GraphicObject element having as a content a URL address of the location of the image file to insert into the page. Additional attribute values may be provided that define the layout of the content of the text or graphic object on the page.

Figure 6:
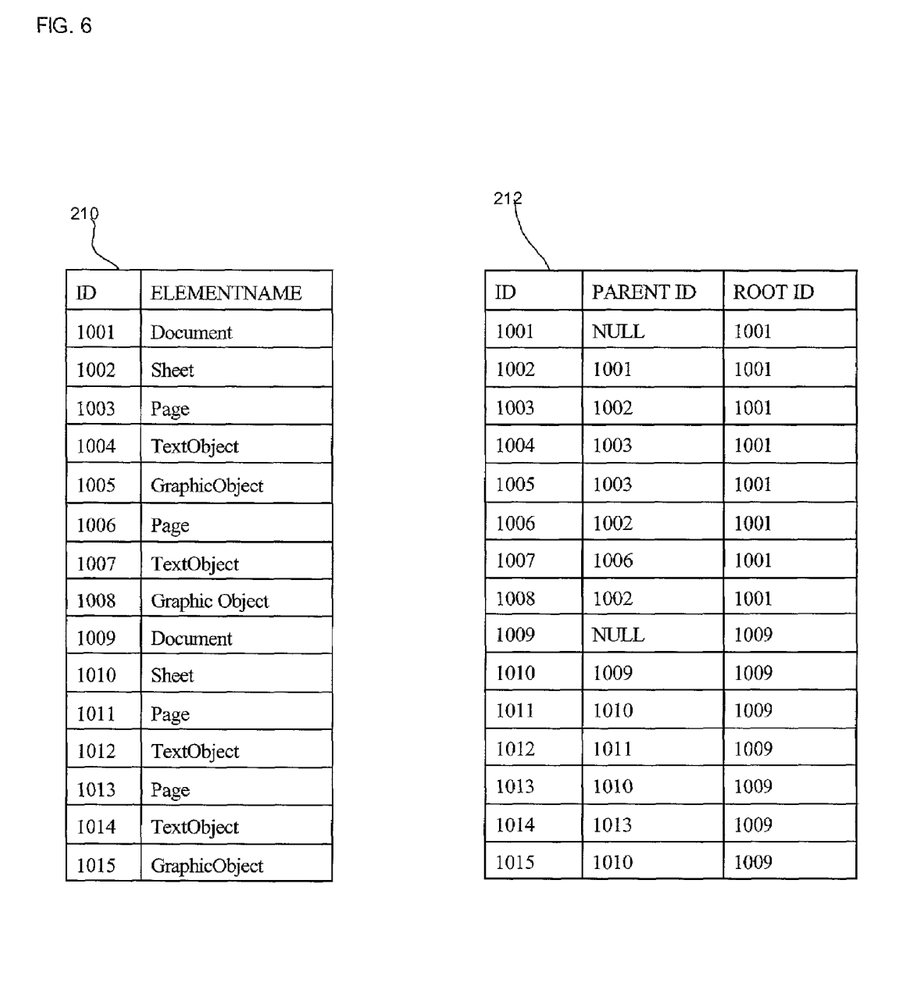
FIGS. 6 and 7 illustrate the database tables that would be generated for the XML documents illustrated in FIG. 5 in accordance with certain implementations of the present invention.
Figure 7:
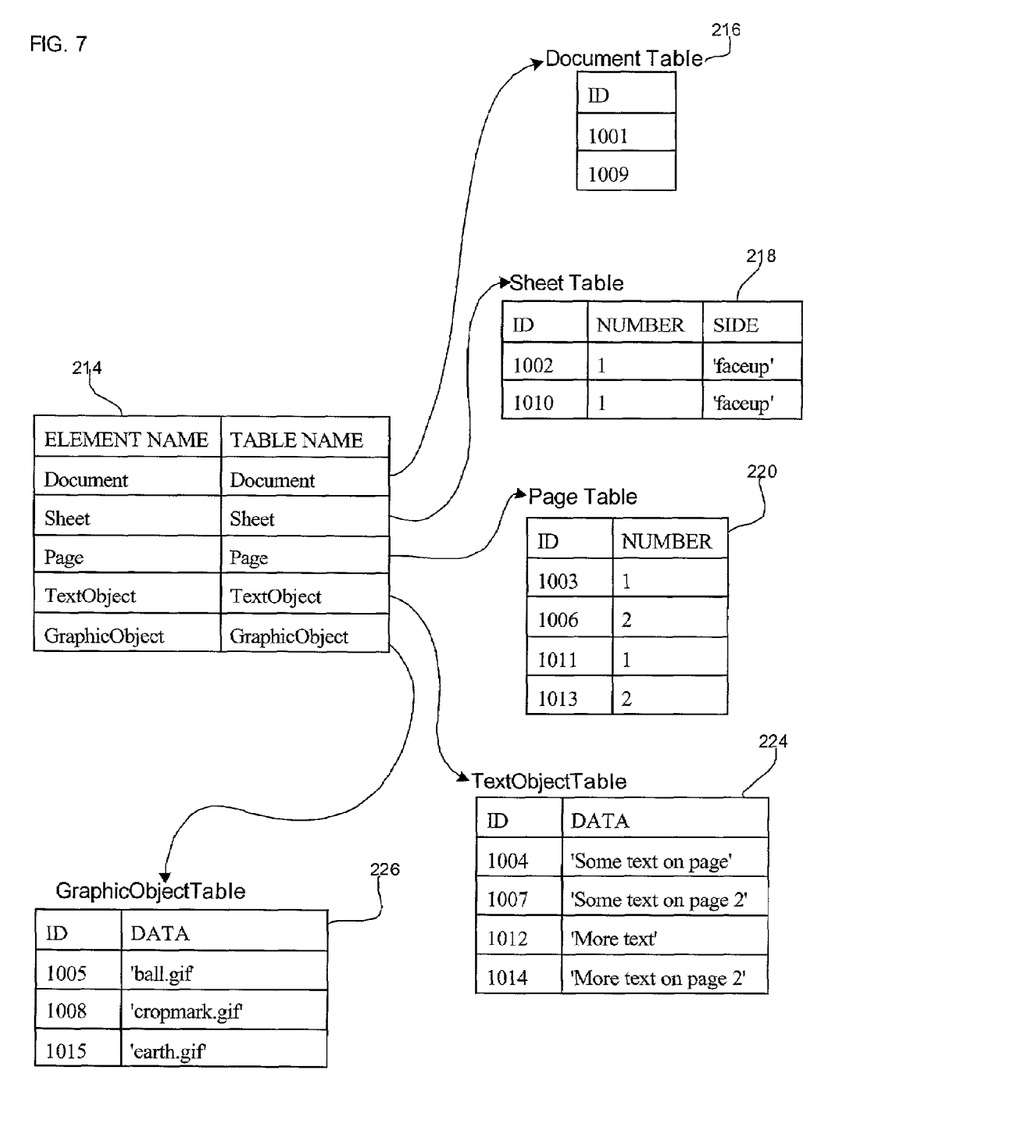

FIG. 6 illustrates an element table 210 generated using the logic of FIG. 3 that includes a umique element identifier for each element instance in the XMIL documents 200 and 202. FIG. 5 also shows the association of the element identifiers in the element directory table 210 with element instances in the XML documents 200 and 202 by numbering the element instances with their element identifier listed in table 210. FIG. 6 Irrther shows a navigation table 212 providing the parent identifier and root identifier for each element instance in XML documents 200 and 202, having root identifier values 1001 and 1009, respectively. FIG. 7 illustrates the table of element tables 214, and each element table 216, 218, 220, 222, and 224 as identified in the table of element tables 222 to provide the attribute values or object content for each element instance.

With the element tables provided for the job ticket XML documents, a user may search for all print jobs that include a certain text or graphic object content by searching the TextObject 224 and GraphicObject 226 element tables to locate the element identifiers of element instances having content matching the search criteria. The XML document manager 10 may then use the determined element identifiers as a lookup value into the navigation table 212 (FIG. 6) to identify the root identifiers, or XML documents 14a, b, . . . n, including the element instances satisfying the search criteria.

The described implementations provide a technique for definig the element structure of XML documents as entries in related database tables in a database program. After information on the XML documents 14a, b, . . . n are defined in tables in the XML database 16, a query of the XML database 16 may be executed to determine those XML documents in the repository 12 including element instances having object data, e.g., attribute values or content, satisfying the search criteria. For relational database implementations, the query may comprise a Structured Query Language (SQL) to determine those XML documents in the XML repository 12 including element instances satisfying the search criteria. Such a query would likely be faster than having to parse all the XML documents in the repository 12 to locate XML documents 14a, b, . . . n having element object data matching the search criteria because the SQL query of the XML database 16 can utilize the query optimization techniques of the database program 8.

Moreover, commonly known SQL commands may be used to search the XML database 4 tables to locate XML documents having object data, e.g., attribute values or content, satisfying the search criteria. This implementation avoids the need of having to have users learn specialized XML searching techniques and instead use common SQL database commands, which are well known in the art. The described implementations are also advantageous as the XML repository 12 expands to include numerous XML documents because database programs, such as relational database programs, are particularly well-suited for storing numerous records and allowing fast searching of large amounts of data.

In a further implementation, one of the tables providing entries for each element instance, such as the element directory table 18 or navigation table 20, may provide a column for maintaining a counter that is incremented whenever the XML document or an element within an XML document is accessed This counter may be used for gathering information on accessed documents for purposes of determining the most popular XML document or for calculating a royalty to pay to the creator of content within the XML document if the content is protected by intellectual property laws.

Following are some further implementations.

The preferred embodiments may be implemented as a method, apparatus or article of manufacture using standard programing and/or engineering techniques to produce software, firmware, hardware, or any combination thereof The term "article of manufacture" (or alternatively, "computer program product") as used herein is intended to encompass one or more computer programs and/or data files accessible from one or more computer-readable devices, caniers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc.

Of course, those skilled in the art will recognize many modifications may be made to this configuration without departing from the scope of the present invention.

The program flow logic described in the flowcharts above indicated certain events occurring in a certain order. Those skilled in the art will recognize that the ordering of certain programig steps or program flow may be modified without affecting the overall operation performed by the preferred embodiment logic, and such modifications are in accordance with the preferred embodiments.

In the described implementations, the information on the element instances in the XML documents was maintained in four different tables, the element directory table 18, navigation table 20, table of element tables 22, and element tables 24a, b, . . . n. Those skilled in the database design art will recognize that there are numerous additional ways to design an arrangement of tables to maintain the information on the element instances in the XML documents.

In preferred embodiments, the element schema of the XML document is determined from the DTD. However, those skilled in the art will recognize that there alternative techniques for determining the element/attribute schema of the document, such as in cases where no DTD is provided. For instance, the entire XML document can be parsed to determine the element schema. Alternatively, an XML schema may be provided which defines the element and attribute schema of the XML document.

In the described implementation, the database program is a relational database program known in the art. Additionally, the database program may comprise a non-relational database program known in the art.

Although a query to determine XML document having element instances whose attribute values or content satisfy the search criteria was described, numerous other types of queries may be performed on the various tables in the XML database. For instance, after identifying element instances that satisfy a search criteria, the navigation table 20 may be used to identify the parent elements of the element instances having attribute values or content matching the search criteria.

In the described implementations, the elements in the documents as arranged in a hierarchical fashion. However, in alternative embodiments, the elements do not have to be in a hierarchical relationship to one another.

In the described implementations, a database system was used to provide information on XML documents. However, the described implementations may apply to other structured document types, such as Dynamic Hypertext Mark-Up Language (DHTML), Cascading Style Sheets, any other Standard Generalized Markup Language (SGML), or any other language known in the art for creating interchangeable, structured documents. In yet further embodiments, the requested file may be in any other file format, i.e., other than an SGML type format, capable of being displayed or otherwise executed by the requesting client.

The XML documents maintained in the XML repository 12 may maintain instances of any type of data object that can be expressed as a structured document, such as print jobs, newspaper articles, Internet Web pages, etc.

The foregoing description of the preferred embodiments of the invention has been presented for the purposes of illustration and description. It is not intended to be exhaustive or to limit the invention to the precise form disclosed Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer readable medium including data structures used for managing structured documents, wherein each structured document has at least one element in common, and wherein each of the at least one element in common is capable of having one defined data object, wherein the data structures include:

at least one table based on a schema of elements in the managed structured documents and including entries for each element instance of a plurality of element instances in the managed structured documents and at least one object for one of the plurality of element instances, wherein for each element instance of the plurality of the element instances in the managed structured documents, the at least one table includes one entry including information on an element identifier for the element instance, the data object for the element instance, and a document identifier for the structured document including the element instance, wherein the at least one table provides an association of the element instance, the at least one data object for the element instance, and the document identifier of the structured document including the element instance, wherein operations are performed on the data structures to search the at least one table, wherein the at least one table comprises: (i) an element directory table providing an element identifier for each element instance in each structured document, wherein a first element identifier is provided for a first element instance in a first structured document, wherein a second element identifier is provided for a second element instance in a second structured document, and wherein the first element identifier and the second element identifier are in the element directory table; and (ii) an element table for each element, wherein each element table includes a column for the element identifier of the element instance and one column for each data object of the element instance.

2. The computer readable medium of claim 1, wherein the structured document comprises an Extensible Markup Language (XML) document.

3. The computer readable medium of claim 1, wherein the at least one table further comprises a navigation table providing a column for the element identifier of the element instance and one other column for the document identifier of the structured document including the element instance, wherein operations may be performed on the data structures to:

determine the element identifiers in each entry in the element table having the at least one data object satisfying the search criteria;
   search the navigation table to determine each entry having an element identifier value matching one determined element identifier including at least one matching data object; and
   determine the document identifier in each determined entry in the navigation table to determine the identity of the structured document including the element instance having the at least one matching data object.

4. The computer readable medium of claim 1, wherein the elements are arranged hierarchically in the structured documents, wherein the at least one table further comprises a navigation table providing a column for the element identifier of the element instance and one column for a parent element of the element instance identified by the element identifier.

5. The computer readable medium of claim 4, wherein the navigation table further includes the document identifier of the structured document for each element instance identified by the element identifier, wherein performing the query further comprises searching the navigation table to determine the document identifier for each element identifier identifying one element instance having one data object satisfying the search criteria.

6. A system for managing structured documents, wherein each structured document has at least one element in common, and wherein each of the at least one element in common is capable of having one defined data object, comprising:

means for generating at least one table based on a schema of elements in the managed structured documents, wherein the at least one table is designed to include entries for each element instance of a plurality of element instances in the managed structured documents and at least one object for one of the plurality of element instances; and
   means for adding for each element instance of the plurality of element instances one entry to the at least one table including information on an element identifier for the element instance, the data object for the element instance, and a document identifier for the structured document including the element instance, wherein the at least one table provides an association of the element instance, the at least one data object for the element instance, and the document identifier of the structured document including the element instance, wherein a query is received, and wherein the query is executed with respect to the at least one table, and wherein the at least one table comprises: (i) an element directory table providing an element identifier for each element instance in each structured document, wherein a first element identifier is provided for a first element instance in a first structured document, wherein a second element identifier is provided for a second element instance in a second structured document, and wherein the first element identifier and the second element identifier are in the element directory table; and (ii) an element table for each element, wherein each element table includes a column for the element identifier of the element instance and one column for each data object of the element instance.

7. The system of claim 6, wherein the object comprises one of an attribute value or content.

8. The system of claim 6, further comprising:

means for receiving the query to identify instances of structured documents having element instances that have at least one data object satisfying a search criteria provided with the query; and
   means for executing the query with respect to the at least one table to determine the element identifiers of element instances having one data object that satisfies the search criteria.

9. The system of claim 8, wherein executing the query further comprises means for determining a document identifier of each said structured document that satisfies the query.

10. The system of claim 6, wherein the structured document comprises an Extensible Markup Language (XML) document.

11. The system of claim 6, further comprising:
means for receiving the query to identify instances of structured documents having element instances that have at least one data object satisfying a search criteria provided with the query; and
means for searching the element table for an entry having at least one data object matching the search criteria.

12. The system of claim 11, wherein the at least one table further comprises a navigation table providing a column for the element identifier of the element instance and one other column for the document identifier of the structured document including the element instance, wherein the means for performing the query further performs:
determining the element identifiers in each entry in the element table having the at least one data object satisfying the search criteria;
searching the navigation table to determine each entry having an element identifier value matching one determined element identifier including at least one matching data object; and
determining the document identifier in each determined entry in the navigation table to determine the identity of the structured document including the element instance having the at least one matching data object.

13. The system of claim 6, wherein the elements are arranged hierarchically in the structured documents, wherein the at least one table further comprises a navigation table providing a column for the element identifier of the element instance and one column for a parent element of the element instance identified by the element identifier.

14. The system of claim 13, further comprising:
means for performing the query by searching the navigation table to determine the element identifier of one parent element for each element instance having one data object that satisfies the search criteria.

15. The system of claim 13, wherein the navigation table further includes the document identifier of the structured document for each element instance identified by the element identifier, wherein the means for performing the query further comprises searching the navigation table to determine the document identifier for each element identifier identifying one element instance having one data object satisfying the search criteria.

16. The system of claim 6, wherein the structured document comprises a job ticket defining attributes and content of a print job, wherein at least one element defines content for the print job and at least one element includes one data object comprising one printing attribute or content of the print job.

17. The system of claim 6, wherein the at least one table comprises a table data structure in a relational database management system.

18. The system of claim 6, wherein the structured document comprises an Extensible Markup Language (XML) document and the element schema is determined from a document type definition (DTD) in the XML managed structured documents.

19. The system of claim 6, wherein one table includes a counter for each element instance, further comprising:
means for returning the content of one element instance in response to a request for the content in the element instance; and
means for incrementing the counter associated with the element instance whose content is returned.

20. A method implemented in a computer system for managing structured documents, wherein each structured document has at least one element in common, and wherein each of the at least one element in common is capable of having one defined data object, comprising:
generating at least one table based on a schema of elements in the managed structured documents, wherein the at least one table is designed to include entries for each element instance of a plurality of element instances in the managed structured documents and at least one object for one of the plurality of element instances;
for each element instance of the plurality of element instances in the managed structured documents, adding one entry to the at least one table including information on an element identifier for the element instance, the data object for the element instance, and a document identifier for the structured document including the element instance, wherein the at least one table provides an association of the element instance, the at least one data object for the element instance, and the document identifier of the structured document including the element instance; and
receiving a query, and executing the query with respect to the at least one table, wherein the at least one table comprises: (i) an element directory table providing an element identifier for each element instance in each structured document, wherein a first element identifier is provided for a first element instance in a first structured document, wherein a second element identifier is provided for a second element instance in a second structured document, and wherein the first element identifier and the second element identifier are in the element directory table; and (ii) an element table for each element, wherein each element table includes a column for the element identifier of the element instance and one column for each data object of the element instance.

21. The method of claim 20, wherein the data object comprises one of an attribute value or content.

22. The method of claim 20, wherein receiving the query and executing the query with respect to the at least one table further comprise:
receiving the query to identify instances of structured documents having element instances that have at least one data object satisfying a search criteria provided with the query; and
executing the query with respect to the at least one table to determine the element identifiers of element instances having one data object that satisfies the search criteria.

23. The method of claim 22, wherein executing the query further comprises determining a document identifier of each said structured document that satisfies the query.

24. The method of claim 20, wherein the structured document comprises an Extensible Markup Language (XML) document.

25. The method of claim 20, wherein receiving the query and executing the query with respect to the at least one table farther comprises:
receiving the query to identify instances of structured documents having element instances that have at least one data object satisfying a search criteria provided with the query; and
searching the element table for an entry having at least one data object matching the search criteria.

26. The method of claim 25, wherein the at least one table further comprises a navigation table providing a column for the element identifier of the element instance and one other column for the document identifier of the structured document including the element instance, wherein performing the query further comprises:

determining the element identifiers in each entry in the element table having the at least one data object satisfying the search criteria;

searching the navigation table to determine each entry having an element identifier value matching one determined element identifier including at least one matching data object; and determining the document identifier in each determined entry in the navigation table to determine the identity of the structured document including the element instance having the at least one matching data object.

27. The method of claim 20, wherein the elements are arranged hierarchically in the structured documents, wherein the at least one table further comprises a navigation table providing a column for the element identifier of the element instance and one column for a parent element of the element instance identified by the element identifier.

28. The method of claim 27, further comprising performing the query by searching the navigation table to determine the element identifier of one parent element for each element instance having one data object that satisfies the search criteria.

29. The method of claim 27, wherein the navigation table further includes the document identifier of the structured document for each element instance identified by the element identifier, wherein performing the query further comprises searching the navigation table to determine the document identifier for each element identifier identifying one element instance having one data object satisfying the search criteria.

30. The method of claim 20, wherein the structured document comprises a job ticket defining attributes and content of a print job, wherein at least one element defines content for the print job and at least one element includes one data object comprising one printing attribute or content of the print job.

31. The method of claim 20, wherein the at least one table comprises a table data structure in a relational database management system.

32. The method of claim 20, wherein the structured document comprises an Extensible Markup Language (XML) document and the element schema is determined from a document type definition (DTD) in the XML managed structured documents.

33. The method of claim 20, wherein one table includes a counter for each element instance, further comprising:

returning the content of one element instance in response to a request for the content in the element instance; and incrementing the counter associated with the element instance whose content is returned.

34. A program for managing structured documents, wherein each structured document has at least one element in common, and wherein each of the at least one element in common is capable of having one defined data object, wherein the program is embodied in a computer readable medium, wherein the structured documents are processed by a processor, and wherein the program is capable of causing the processor to perform:

generating at least one table based on a schema of elements in the managed structured documents, wherein the at least one table is designed to include entries for each element instance of a plurality of element instances in the managed structured documents and at least one object for one of the plurality of element instances;

for each element instance of the plurality of element instances in the managed structured documents, adding one entry to the at least one table including information on an element identifier for the element instance, the data object for the element instance, and a document identifier for the structured document including the element instance, wherein the at least one table provides an association of the element instance, the at least one data object for the element instance, and the document identifier of the structured document including the element instance; and receiving a query, and executing the query with respect to the at least one table, wherein the at least one table comprises: (i) an element directory table providing an element identifier for each element instance in each structured document, wherein a first element identifier is provided for a first element instance in a first structured document, and wherein a second element identifier is provided for a second element instance in a second structured document, wherein the first element identifier and the second element identifier are in the element directory table; and (ii) an element table for each element, wherein each element table includes a column for the element identifier of the element instance and one column for each data object of the element instance.

35. The program of claim 34, wherein the data object comprises one of an attribute value or content.

36. The program of claim 34, wherein receiving the query and executing the query with respect to the at least one table further comprises:

receiving the query to identify instances of structured documents having element instances that have at least one data object satisfying a search criteria provided with a query; and executing the query with respect to the at least one table to determine the element identifiers of element instances having one data object that satisfies the search criteria.

37. The program of claim 36, wherein executing the query further comprises determining a document identifier of each said structured document that satisfies the query.

38. The program of claim 34, wherein the structured document comprises an Extensible Markup Language (XML) document.

39. The program of claim 34, wherein receiving the query and executing the query with respect to the at least one table further comprises:

receiving the query to identify instances of structured documents having element instances that have at least one data object satisfying a search criteria provided with the query; and searching the element table for an entry having at least one data object matching the search criteria.

40. The program of claim 39, wherein the at least one table further comprises a navigation table providing a column for the element identifier of the element instance and one other column for the document identifier of the structured document including the element instance, wherein performing the query further comprises:

determining the element identifiers in each entry in the element table having the at least one data object satisfying the search criteria;

searching the navigation table to determine each entry having an element identifier value matching one determined element identifier including at least one matching data object; and determining the document identifier in each determined entry in the navigation table to determine the identity of the structured document including the element instance having the at least one matching data object.

41. The program method of claim 34, wherein the elements are arranged hierarchically in the structured documents, wherein the at least one table further comprises a navigation table providing a column for the element identifier of the element instance and one column for a parent element of the element instance identified by the element identifier.

42. The program of claim 41, further comprising performing the query by searching the navigation table to determine the element identifier of one parent element for each element instance having one data object that satisfies the search criteria.

43. The program of claim 41, wherein the navigation table further includes the document identifier of the structured document for each element instance identified by the element identifier, wherein performing the query further comprises searching the navigation table to determine the document identifier for each element identifier identifying one element instance having one data object satisfying to search criteria.

44. The program of claim 34, wherein the structured document comprises a job ticket defining attributes and content of a print job, wherein at least one element defines content for the print job and at least one element includes one data object comprising one printing attribute or content of the print job.

45. The program claim 34, wherein the at least one table comprises a table data structure in a relational database management system.

46. The program of claim 34, wherein the structured document comprises an Extensible Markup Language (XML) document and the element schema is determined from a document type definition (DTD) in the XML managed structured documents.

47. The program of claim 34, wherein one table includes a counter for each element instance, and wherein the program is further capable of causing the processor to perform:

returning the content of one element instance in response to a request for the content in the element instance; and incrementing the counter associated with the element instance whose content is returned.

* * * * *

UNITED STATES PATENT AND TRADEMARK OFFICE
CERTIFICATE OF CORRECTION

| | | |
|---|---|---|
| PATENT NO. | : 6,959,416 B2 | Page 1 of 1 |
| APPLICATION NO. | : 09/772697 | |
| DATED | : October 25, 2005 | |
| INVENTOR(S) | : Kyle P. Manning and Dwight Ross Palmer | |

It is certified that error appears in the above-identified patent and that said Letters Patent is hereby corrected as shown below:

Column 9, line 19, delete "of the element" and insert -- of element -- .

Column 12, line 58, delete "farther" and insert -- further -- .

Column 15, line 22, delete "to search" and insert -- the search -- .

Signed and Sealed this

First Day of May, 2007

JON W. DUDAS
*Director of the United States Patent and Trademark Office*